United States Patent Office 3,002,378
Patented Oct. 3, 1961

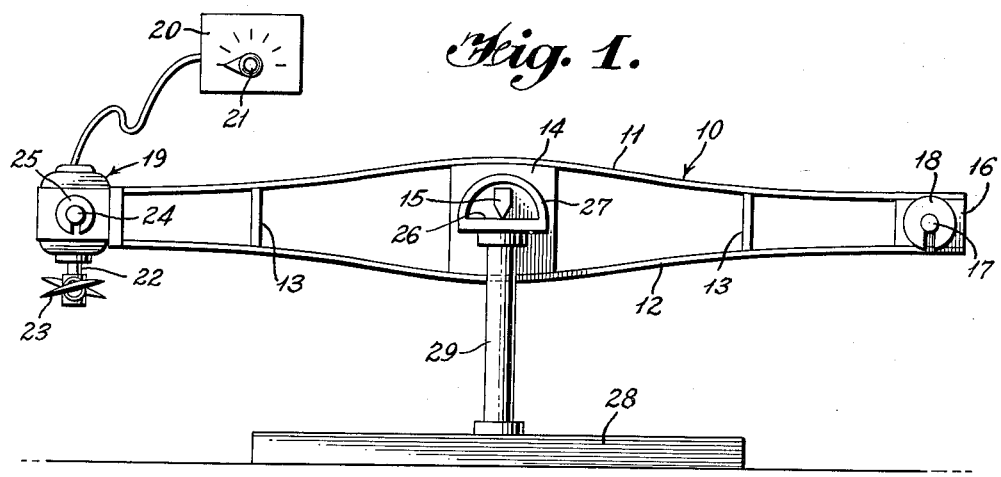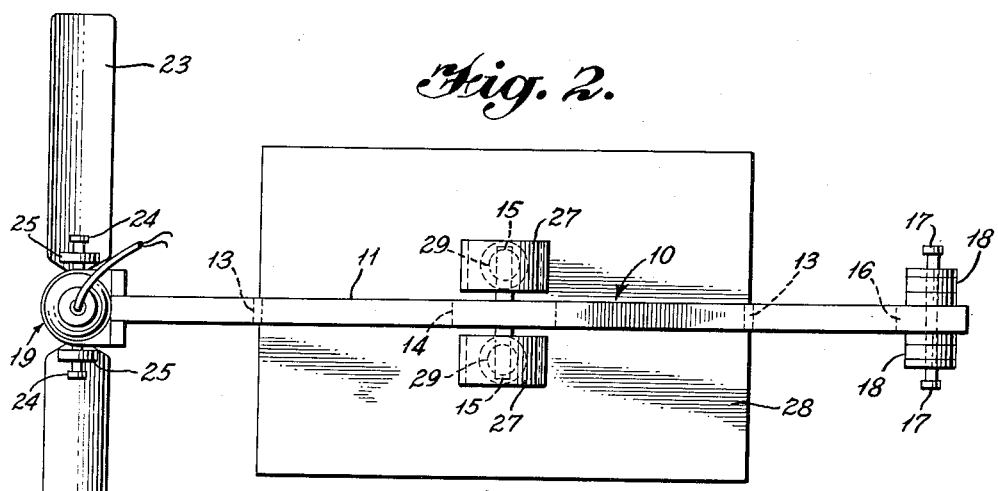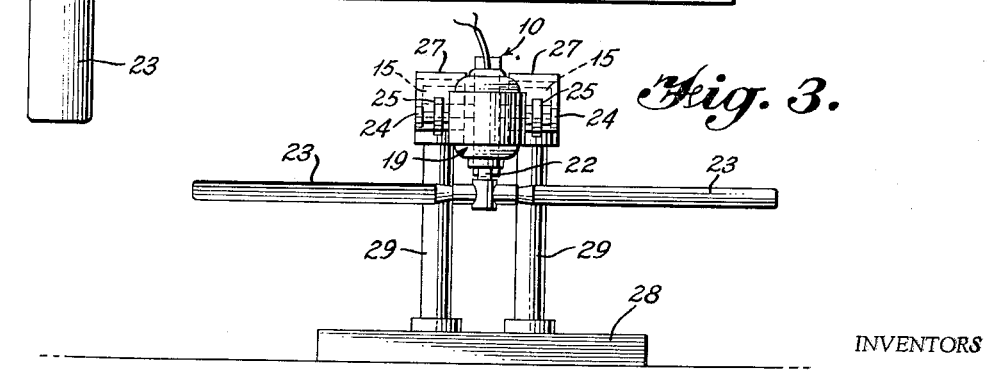

3,002,378
ISOCHRONIC SYSTEM FOR TESTING OF AIRCRAFT
Norman K. Walker, Kensington, and Don F. Widmayer, Bethesda, Md., assignors to Advanced Research Associates, Incorporated, Kensington, Md.
Filed Mar. 25, 1958, Ser. No. 723,685
4 Claims. (Cl. 73—147)

This invention relates to a method for aerodynamic testing of aircraft and more particularly to testing pilot reaction in handling the aircraft. By the term "pilot" is meant either auto pilot or human pilot.

It is a common practice to "fly" models of full scale aircraft or parts of the aircraft to determine the behavior of the full scale craft or part. This may be done by positioning the model in a wind tunnel and "flying" the model therein. By this technique, data is obtained which may be accurately related to that expected from the full scale structure provided certain dynamic scaling laws are observed in making the model. Generally speaking, there are three such laws to be observed which are:

If the linear scale of the model is reduced by a scaling factor "$n$" then (1) The mass must be reduced by $n^3$, that is, the density of the model must be the same as that of the full scale aircraft.

(2) The distribution of the mass in the model must be identical with that of the full scale aircraft, that is, the position of the center of gravity must be the same and the three radii of gyration about the principal axes must vary as "$n$."

(3) The forward speed of the model must be selected to preserve the correct relation of dynamic forces to gravitational effects, which implies that it will vary as $\sqrt{n}$ and the model will then follow the same scaled geometric flight path as the full scale aircraft, both as regards position and angle. However, its reactions will be very much quicker since the non-dimensional aerodynamic unit of time will be held constant. This implies that the period of any oscillatory motion will be scaled according to $\sqrt{n/g}$ where "$g$" is the acceleration due to gravity.

This form of scaling gives correct results under all conditions of flight and is useful even for flight in a mixture of media such as in experiments on the alighting of seaplanes but the aerodynamic time is a real disadvantage since the model cannot be flown to test pilot reactions nor can it be used to test auto pilot components since it is essential in this latter case that any aerodynamic lag be corrected. In view of this, dynamic model tests tend to be confined to a qualitative examination of the behavior of an aircraft in order to determine marked undesirable aerodynamic features.

As we have seen from the above laws, if for instance we provide a one-tenth scale model, that is, "$n$" equals $\frac{1}{10}$, in order to simulate the behavior of the aircraft under the conditions of actual or real reaction time, the pilot will have to react $\sqrt{10}$ times as fast as would be the case under full scale conditions or about 3 times as fast. Present systems designed to test pilot reaction consequently must provide expensive and complicated computer devices in order to simulate actual pilot reaction. Without these computer devices as we have said before, the dynamic model tests are confined to a qualitative examination of an aircraft to detect undesirable aerodynamic features.

It is therefore an object of this invention to provide a method and apparatus for testing pilot reaction without the use of computers.

It is more specifically an object of this invention to provide a method for "flying" models under a test set-up in which provision is made to hold the time scale constant to provide actual or real reaction time for pilot operation of the model.

These and other objects of the invention will be obvious from a detailed description of the accompanying drawings.

In the drawings:
FIG. 1 is a side elevation, partly diagrammatic, of one embodiment of the invention.
FIG. 2 is a top plan view of the invention of FIGURE 1.
FIG. 3 is an end view of the invention of FIG. 1.

There are many occasions when dynamic tests would be of great use if only the time scale could be held constant, irrespective of model size, especially if the velocity scaling also were such that the model appears to be behaving in exactly the same way as a full scale aircraft seen from a distance. This implies that all displacement should vary as to linear scale and that time is to be invariant. Such a model could be used with great success both as to a pilot training device and as a test bed for the full scale auto pilot.

Now since the velocity in model lengths per second is to remain constant, this implies that all accelerations, whether due to gravity or aerodynamic forces, must be constant when expressed in model lengths per second, per second. This result can only be achieved if the effect of gravity is scaled down in proportion to the model. Another way of saying the same thing is that the aerodynamic time unit "$\sqrt{n/g}$" is held constant, therefore "$g$" must be proportional to "$n$." The laws of isochronic scaling are then the same as the first two laws of dynamic scaling previously enumerated plus third and fourth laws as follows:

(3) The forward speed of the model must be scaled as $n$.

(4) The weight of the model must be artificially reduced by some means in proportion to the scale without altering the mass, in other words, "$g$" must be scaled as "$n$."

As we have seen, under the laws of dynamic scaling the period of any oscillatory motion will be scaled according to $\sqrt{n/g}$ where "$g$" is the acceleration due to gravity. If the scaling factor is one-tenth the period of any oscillatory motion will be divided by $\sqrt{10}$. Consequently, the reaction time for the pilot or auto pilot must be increased by a factor of $\sqrt{10}$, which is an insurmountable difficulty without additional equipment, such as computers. Now, however, in accordance with the isochronic scaling technique if we also scale "$g$" by the same factor, that is the scaling factor, we find that the reaction time will be real or actual time. Let us compare dynamic scaling and isochronic scaling in the case of a $\frac{1}{5}$ scale model ($n=.2$) of a VTOL aircraft.

It can be seen from the above that in accordance with the dynamic scaling the weight is to be multiplied by a factor $n^3$. The mass is to be multiplied by a factor also of $n^3$. The test speed is multiplied by $\sqrt{n}$, the static thrust is multiplied by $n^3$, the power since it equals thrust times velocity is multiplied by $n^3\sqrt{n}$. With relation to the isochronic scaling the weight is multiplied by a factor of $n^4$, the mass is multiplied by $n^3$, the test speed is multiplied by a factor $$\frac{1}{n}$$

the static thrust is multiplied by a factor of $n^4$, and the power is multiplied by a factor of $n^4n$ or $n^5$.

The isochronic model is not only a more suitable and convenient test bed for aerodynamic work but is far easier to build. An electric motor capable of delivering 7.2 horsepower is very likely to eat up an undue proportion of the 64 lbs. mass allowed for the dynamic model, but a motor delivering only .64 horsepower need only weigh a few pounds and could even be a cheap and controllable D.C. motor.

Bearing in mind that the weight equals the mass times "g" where "g" is the gravitational acceleration of 32 feet per second per second, it can be seen that it is important in all isochronic scaling that the ratio of mass to weight must always equal the scaling factor. By doing this we obtain true reaction time for pilot and auto pilot since we have actually scaled down "g" by the scaling factor.

Referring to the drawings, there is illustrated an example of isochronic scaling used to investigate the vertical stability of a helicopter. Numeral 10 indicates a very light assembly of negligible weight and inertia. The assembly includes an upper beam 11 and a lower beam 12 having supporting structures 13 positioned therebetween. Centrally located between the beams 11 and 12 is a supporting member 14 for carrying knife edges 15. At one end of the assembly is positioned a weight supporting member 16 carrying pins 17 for positioning weights 18 thereon. At the other end of the assembly is mounted a motor assembly 19. A control unit 20 is provided for controlling the speed of the motor. This may be done by use of a handle 21 which is turned clockwise or counter-clockwise to adjust the speed of the motor. The drive shaft 22 of the motor carries the propeller assembly 23. Pins 24 mounted to the motor assembly are provided for supporting weights 25.

The knife edges 15 support the assembly on the surfaces 26 of members 27, which are in turn supported from the platform 28 by the supporting member 29.

It can be seen from the above that sufficient weights 18 are mounted on the pins 17 whereby with the propeller stationary the entire assembly is perfectly balanced on the knife edges 15. Then sufficient weights 25 are positioned on the pins 24 whereby the total of these weights is equal to the weight of the full scale helicopter divided by the scaling factor.

Now if we assume that this is set up as a one-tenth scale model ($n=\frac{1}{10}$) of a particular fixed pitch rotor-type helicopter and that the helicopter mass is equal to five hundred pounds, the total mass of the model will be equal to five hundred times $n^3$ or approximately .5 pound. This is the actual mass of the elements mounted at both ends of the assembly 10 including weights 25. The weight to be lifted by the rotor in the actual model is of course five hundred pounds. However, the weight to be lifted by the model is five hundred times $n^4$ or .05 pound. This is the actual weight of weights 25. The assembly 10 is balanced before addition of weights 25. Now, the time to accelerate the rotor under full scale is one second and this is also the time to accelerate the rotor under the scale model conditions. The speed of the rotor is 500 r.p.m. under full scale and also 500 r.p.m. under the model scaling. The whole assembly is free to rotate about the pivot and for small movements the displacement of the rotor is substantially vertical. The lift is controlled by a rheostat and the power supply to the motor.

It can be seen from the above that in accordance with this scheme the weight to be lifted by the rotor is actually equal only to the weight in the model scaling of the weights 25. Weights 25 have been scaled down by $n^4$ where "n" is the scaling factor. The work actually done by the rotor is that work necessary to lift .05 pound. The balancing of the structure on the pivot point is such that $$\frac{Mn^3 - Wn^4}{2}$$

is positioned on both sides of the pivot point with equal moment arms. Under the conditions existing before the weights 25 are added the assembly is at perfect balance. The load on the rotor is zero. Consequently, by adding a weight which is equal to the weight under full scale times $n^4$ we have scaled down "g" by a factor equal to the scaling factor.

This result can be obtained in many other ways. For instance, we might suspend the model from a spring which has a constant ratio of tension to length and using the case where the scaling factor is equal to .1 we could provide a suitable spring so as to support nine-tenth of the weight of the model leaving one-tenth of the weight of the model to be acted upon by the lift of the rotor. Here again we have reduced "g" by the factor "n."

Another scheme would be to suspend the model over a frictionless pulley, providing on the other end of the pulley a weight equal to nine-tenths of the weight of the model. Again the rotor would be called upon to lift only one-tenth the weight.

Certain present day VTOL aircraft take off vertically and then tilt slowly into the horizontal position to achieve forward speed. Calculation of the behavior of the aircraft during this transition maneuver is extremely difficult, since the angles of incidence reached may be well outside the stalling ranges of the aerofoils used while the very powerful thrust required is likely to leave large vortex rings which will have a considerable effect on the aerodynamics of the airplane before it flies clear. These effects are likely to be greatly accentuated if transition is attempted very rapidly and near the ground, as is likely to be desirable from the military point of view. The NACA (3.2a Circular Flight Path tests) have made a series of dynamic model tests roughly as follows. The model is electrically controlled by cables suspended from the boom of a large rotary crane. It takes off vertically and is controlled to fly in a circle around the crane and the crane operator follows the model with the crane to insure that the cable is kept slack. A number of pilots are used, one for each aerodynamic control and one for the engine, since the speed of response is such that one pilot cannot react fast enough to fly the model singlehanded.

To adapt this technique to isochronic scaling, a steel wire could be taken vertically down to the center of gravity of the model and tensioned to relieve the correct percentage of the weight of the model. A strain sensitive element would be fitted to the wire and connected to a servo-operated drum so that as the model rose the correct tension would be maintained in the wire, or in some cases a simple spring or weight device could be used. The wire would be maintained truly vertical by any of the following means:

(a) A light could be placed near the center of gravity of the model and two servos with photo-electric pickups arranged to move the top end of the wire both radially and tagentially so that it would always be above the light.

(b) The inclination of the wire at the top could be detected and used as a nulling signal. This would be less accurate than the photo-electric system but would be very simple and might, in many cases, be good enough.

(c) The upper servo could be used to maintain fore and aft position only while a signal from the cable or an upper light source, or some form of track on the ground could be coupled into the rudder of the model to force it to fly the correct circular path. Since most interest attaches to the vertical maneuver using the engine and pitch control it might be very convenient to have the rudder automatically operated.

(d) The roll angle of the model relative to the lower end of the cable could readily be detected and used as a roll stabilization signal to control the model automatically in roll.

(e) As an additional convenience, the movement of the upper end of the wire could also be transmitted to the crane operator and even used to control the crane motion itself, as a sluggish follow-up on the high speed servo.

In many cases there would be some advantage and simplification to be achieved by abondoning the circular flight path and supporting the model from an overhead runway so that it flew in a straight path. With the tiny $\frac{1}{10}$ scale models made possible for some purposes, such a track could even be erected in an ordinary room and would be quite practical as a training device.

When the weight of the model is referred to, it is meant the apparent weight, since the true weight of the model is supported in some fashion in a manner to scale down $g$. This leaves only the apparent weight to be carried or supported by the system.

What has been described are specific embodiments of the present invention but other embodiments obvious from the teachings herein to those skilled in the art are contemplated to be within the spirit and scope of the accompanying claims.

What is claimed is:

1. A method of constructing an "$n$" scale model of a full scale aerodynamic structure for use in determining the aerodynamic and pilot reaction characteristics of said full scale aerodynamic structure where "$n$" represents the scaling factor comprising the steps of (1) making the mass of the model equal to $n^3M$ where M equals the mass of the full scale structure and (2) making the weight of the model equal to $n^4W$ where W equals the weight of the full scale structure.

2. A method of contructing a model aerodynamic structure having a scaling factor of "$n$" for use in determining the aerodynamic and pilot reaction characteristics of the full scale structure when operating in a structure supporting medium that comprises scaling down the mass of said structure by the factor $n^3$ and scaling down the weight of said structure by the factor $n^4$.

3. A method of constructing an "$n$" scale model of a full scale aerodynamic structure where "$n$" is the scaling factor comprising: (1) making the mass of the model equal to $n^3M$ where M equals the mass of the full scale structure, said mass being distributed in the same manner as the mass distribution in the full scale model to provide the same relative position of the center of gravity and to reduce the radii of gyration of the model about the principal axes to R times $n$ where R equals the radii of gyration of the full scale model and (2) making the weight of the model equal to $n^4W$ where W equals the weight of the full scale structure.

4. A method for preparing a test for determining the aerodynamic and pilot reaction characteristics of a full scale aerodynamic structure while operating said structure in a structure supporting medium that comprises (1) constructing an $n$ scale model, where $n$ equals the scaling factor, having a mass equal to $n^3M$ where M equals the mass of the full scale structure, said mass being distributed in the same manner as the mass distribution in the full scale model to provide the same relative position of the center of gravity and to reduce the radii of gyration of the model about the principal axes to R$n$ where R equals the radii of gyration of the full scale model, and a weight equal to W$n^4$ where W equals the weight of the full scale structure and (2) operating said model in said supporting medium by providing relative movement between said model and said medium, said relative movement having a velocity equal to V$n$ where V equals the velocity of the full scale structure in said supporting medium.

References Cited in the file of this patent

UNITED STATES PATENTS

| | | |
|---|---|---|
| 2,552,727 | Lightfoot | May 15, 1951 |
| 2,716,889 | Doman | Sept. 6, 1955 |
| 2,785,569 | Miller | Mar. 19, 1957 |

OTHER REFERENCES

American Soc. of Civil Eng. Transactions vol. 96 (1932) pages 273–277, "Theory of Similarity and Models" by Broat. (Copy in Scientific Library.)

Publication: "Wind Tunnel Technique" by Pankhurst et al. (1952), page 4. (Copy in Scientific Library.)

Publication: "Pilot Plants, Models and Scale-Up Methods In Chemical Engineering," by R. E. Johnstone et al. (1957), McGraw-Hill Book Co., pages 19–21. (Copy in Scientific Library.)